United States Patent [19]

Schmid et al.

[11] 4,232,145

[45] Nov. 4, 1980

[54] INJECTION MOLDABLE GLASS CLEAR TRANSPARENT POLYAMIDE

[75] Inventors: Eduard Schmid, Bonaduz; Wolfgang Griehl, Chur, both of Switzerland

[73] Assignee: Inventa AG fur Forschung und Patentverwertung, Zurich, Zurich, Switzerland

[21] Appl. No.: 970,643

[22] Filed: Dec. 18, 1978

Related U.S. Application Data

[63] Continuation of Ser. No. 745,897, Nov. 29, 1976, abandoned, which is a continuation of Ser. No. 731,810, Oct. 12, 1976, abandoned.

[51] Int. Cl.$^3$ .............................................. C08G 69/36
[52] U.S. Cl. ................................ 528/324; 260/33.4 R; 525/432; 528/310; 528/326; 528/330; 528/338; 528/346; 528/347; 528/349
[58] Field of Search ............... 528/324, 310, 326, 330, 528/338, 346, 347, 349

[56] References Cited

U.S. PATENT DOCUMENTS 3,847,877  11/1974  Nielinger et al. ..................... 528/330

*Primary Examiner*—Harold D. Anderson
*Attorney, Agent, or Firm*—Bierman & Bierman

[57] ABSTRACT

Polyamides are described which are useful for injection molding and which are produced by the polycondensation of (a) a diaminodicyclohexane or a diaminodicyclohexylalkane, (b) a polyamide-forming aromatic dicarboxylic acid of more than 9 carbon atoms, and (c) an ω-amino-acid, a lactam of more than 9 carbon atoms, or an aliphatic dicarboxylic acid-diamine mixture or salt thereof.

19 Claims, No Drawings

INJECTION MOLDABLE GLASS CLEAR TRANSPARENT POLYAMIDE

This is a Rule 60 continuation of copending application No. 745,897, filed Nov. 29, 1976, which is a continuation of our corresponding application, Ser. No. 731,810, filed Oct. 12, 1976, both now abandoned.

This invention relates to glass-clear transparent polyamide, its manufacture and its use, e.g. in injection molding.

It is well known that polyamides and copolyamides can be manufactured from amines of the dicycane type, i.e. di(4-aminocyclohexyl) alkanes, as well as from 4,4'-diaminodicyclohexane(s). However, these copolyamides are difficult to work with, have poor mechanical properties, have poor stability of transparency in boiling water or organic liquids and solutions, and are made from expensive raw materials. In general, liquid isomer mixtures of these amines are used.

The dicycane class of amines has been described in British Pat. No. 619,707. Although the copolyamides described in that specification have good characteristics, further improvement in workability, stability of transparency in boiling water and stability in solutions and solvents, as well as hydrolytic decomposition, would be desirable. Furthermore, it would be desirable to use cheaper starting materials.

Other known methods for the manufacture of transparent polyamides using diamines of the dicycane type are disclosed in Swiss Pat. No. 449,257, in U.S. Pat. Nos. 2,494,563; 3,842,045 and 3,840,501, and in Japanese patent application No. 7211502. In addition to the dicycane, relatively costly, long chain dicarboxylic acids such as azelaic acid, sebacic acid or dodecanedioic acid are used in order to obtain products which have an acceptably low melt viscosity; e.g. below 10,000 to 20,000 poise at 300° C. If relatively cheap fatty acids are used as the sole acid component, a colored end product having a glass conversion temperature and melt viscosity which are too high for treatment at ordinary temperatures is frequently obtained. Therefore, co-components, e.g. so-called AH-salts (adipic acidhexamethylene-diamine salts) or caprolactam, have to be used in order to lower these values. The polyamides manufactured in this way have poor stability in hot water and solvents and have a relatively large absorption capacity for water, resulting in volume variations during conditioning of the product obtained by injection molding.

U.S. Pat. No. 2,696,482 describes a transparent polyamide, prepared from a dicycane and isophthalic acid, which is very resistant to hot water. However, in order to obtain good results from the condensation reaction, the diphenyl ester of isophthalic acid must be used, or phenol must be added to the polycondensation mixture as solvent or plasticizer. As a result of the high temperature of plastification and the high melt viscosity of the resultant polyamide melt, working temperatures of about 330° C. are necessary. The maximum water absorption of this product is 7.75%.

The copolyamides described in U.S. Pat. No. 3,847,877, which are obtained from an isophthalic acid-terephthalic acid mixture also containing nylon 6 as a cocomponent, display a similarly high water absorption capacity, and tend to cloud after a few days when treated with boiling water. The transparent polyamide described in U.S. Pat. No. 3,597,400, which is manufactured from an isophthalic acidterephthalic acid mixture and a dicycan diaminohexane mixture with a large proportion of diaminohexane as the diamine component, exhibits far too high a water absorption capacity. Thus, when storing such polyamides in water, the softening point drops to 50°–60° C.

Surprisingly, it has been found that glass-clear transparent polyamides can be manufactured that have good mechanical characteristics, together with excellent stability of transparency in boiling water. According to the present invention, such polyamides are prepared by the polycondensation of (a) a diamine of the formula

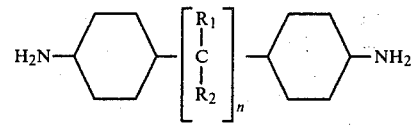

wherein $R_1$ and $R_2$ are each hydrogen or methyl and n is zero or an integer of from one to 6, and wherein each cyclohexane ring can be substituted by one or more methyl groups; (b) an approximately stoichiometric amount, based on the amount of component (a), of a dicarboxylic acid or acid mixture consisting of from 50 to 100% of isophthalic acid, from 0 to 50% (mol. or by weight) of terephthalic acid, and from 0 to 15 mol. % of at least one other polyamide-forming dicarboxylic acid; and (c) 30 to 40% by weight, based on the total weight of components (a), (b) and (c), of a further polyamide-forming component which is (i) a ω-amino-acid or a lactam thereof, having more than 9 carbon atoms; or (ii) a salt (or a stoichiometric 1:1 mixture) of an aliphatic dicarboxylic acid which is preferably of the formula $HOOC-(CH_2)_p-COOH$, and an aliphatic diamine which is preferably of the formula $H_2N-(CH_2)_q-NH_2$; subject to the conditions that the average number of carbon atoms between the amide groups or between each pair of amide-forming groups is at least 9, that the number of carbon atoms between the amide-forming groups is at least 6, and that, when component (b) is not 100% isophthalic acid, the sum of the weights of the aliphatic dicarboxylic acids and of component (c) must be from 30 to 40% by weight, based on the total weight of components (a), (b) and (c).

Mixtures of the specified additional components can be used within the scope of the present invention. If, within the definition of component (c), more than one compound and/or pair of salts is used, the requirement that the average number of carbon atoms per amide group or between each pair of amide-forming groups should be at least 9, still applies for the sum of all the individual components used.

Preferred diamines of the dicycane type, used as component (a), are bis(4-amino-3-methyl-cyclohexyl)methane and 2,2-bis(4-amino-cyclohexyl)propane. Other suitable compounds include 4,4'-diamino-dicyclohexylmethane and 1,2-bis(4-aminodicyclohexyl)ethane. In practice, the usual isomer mixture of such a diamino compound is used. Such mixtures are, for example, liquid at 25° C.

The use of isophthalic acid alone as component (b) is preferred. However, a commercial mixture of isophthalic acid and terephthalic acid may also be used. The isophthalic acid or isophthalic acid-terephthalic acid mixture may contain up to 15 mol %, based on the acid or mixture, of another polyamide-forming dicarboxylic acid. Suitable acids of this type contain more than 6 carbon atoms and are preferably suberic acid, azelaic acid, sebacic acid, dodecanedioic acid or a side-chain substituted homolog. Preferably no other polyamide-forming dicarboxylic acids are used.

Preferred ω-amino acids for use as component (c) are aminolauric acid and aminoundecanoic acid. The preferred lactam is the lactam of aminlauric acid, i.e. laurolactam. Suitable salts or stoichiometric mixtures for use as component (c) are those of α, ω-diamino-alkanes and α, ω-alkane dicarboxylic acids and their side-chain substituted homologs. Preferred diamines are 1,6-diaminohexane, 1,8-diaminooctane, 1,9-diaminononane, 1,10-diaminodecane, 1,12-diaminododecane and trimethylhexamethylene-diamine. Preferred dicarboxylic acids are azelaic, sebacic and dodecanedioic acids. These diamines and dicarboxylic acids can be combined as desired to form salts. Examples of the salts are the 1,12-diaminododecanedodecanedioic acid salt and salts of azelaic or sebacic acid with diamino-hexane, diaminooctane, diaminododecane or diaminononane.

"Amide-forming groups" are $-NH_2$ and $-COOH$ groups. A derivative of a carboxyl group which is capable of forming an amide may also be used, e.g. as ester or acid halide. These derivatives can be used in the invention as acid chlorides or methyl or ethyl esters. The same is true, in principle, for the acids used as component (b). In practice, however, the free dicarboxylic acids are generally preferred. Components (a) and (b) can also be used in salt form.

The polymers of the present invention are generally manufactured in accordance with known polycondensation methods. The diamine and dicarboxylic acids must be present in equivalent amounts so that the products which are obtained have the required molecular weights. By using an excess of diamine or dicarboxylic acid in the reaction mixture, the chain length of the product can be adjusted. The chain length can also be restricted by adding a predetermined quantity of a monoamine or a monocarboxylic acid to the reaction mixture. It should be noted that, for component (c), the equivalent weight of ω-amino acids or their lactams is equal to the molecular weight. For the salts and stoichiometric mixtures of diamines and dicarboxylic acids, the equivalent weight is equal to half the sum of the weight of the dicarboxylic acid and the diamine.

When an ω-amino acid or lactam is used as component (c), the general procedure used in the synthesis is, for example, to introduce aminoundecanoic acid directly to the reaction mixture. If laurolactam is used, it is added to the reaction mass. However, prior to the polycondensation reaction, a compression phase must be carried out, so that the lactam ring is split.

If dicarboxylic acids and diamines are used as component (c), the acids and amines can be added individually or in the form of a salt. Salts of straight chain α, ω-dicarboxylic acids and α, ω-diamines can be prepared fairly readily and no stoichiometric problems occur with the use of pure salts. If, as is preferred, a mixture of diamines with isophthalic acid or with an isophthalic acid-terephthalic acid mixture and lauric lactam is used, the educt mixture obtained, which contains some water, is first subjected to compression treatment to open the lactam ring. The pressure is then released and the water is drawn off under an inert gas or vacuum during the polycondensation. If diamines and dicarboxylic acids are used, either individually or as salts, the neutralizing reaction is carried out at temperatures at which, by adding some water, a suspension which can be stirred (or a melt) is obtained, and the temperature is then raised in steps. In order to prevent the loss of amines, pre-condensation can be carried out in a closed system under pressure. This pressure is then released, followed by an optional vacuum stage, for example by a further step-wise increase of the reaction temperature.

Additives which are conventionally used in the manufacture of polyamides can be added to the polycondensation mixture before, during or towards the end of polycondensation. These additives are preferably soluble in the polyamide on account of their effect on transparency. Suitable additives are, for example, light and heat stabilizers, e.g. aromatic amines such as diphenylamine, phosphoric compounds such as phosphoric acid, and/or soluble metal compounds, e.g. of copper or manganese; colorants; optical brighteners; plasticizers; mold release agents; flame-resistant agents and, when transparency of the polyamide is less important than mechanical characteristics, reinforcing materials such as glass fibers, asbestos fibers, glass beads or mineral fillers. Many of these additives can also be rolled into or extruded with the polymer.

Generally speaking, the basic starting materials used for the manufacture of the copolyamides of the present invention are well suited to polycondensation in the melt. They are resistant to high temperatures and scarcely color during polycondensation, even when temperatures of 280° to 320° C. are used. This is in contrast to the use of a hexamethylene-diamine-adipic acid salt (which is excluded from the present invention). If the polyamide-forming component (c) is used in an amount of from 30 to 40% by weight, the end product has a glass conversion temperature of approximately 140° to 170° C. and the degree of transparency will remain stable in boiling water over several weeks. It is especially advantageous to use component (c) in an amount such that the glass conversion temperature (Tg) of the copolyamide is 150° to 170° C. On reducing the quantity of component (c), the glass conversion temperature rises, and falls on increasing the amount.

The melt viscosity, at 300° C., of the copolyamides obtained in accordance with the present invention is, in the case of average polymerization degrees of polymers from 80 to 200; when each unit is considered as a member of the chain, approximately 2,000 to 15,000 poise and can be, as is preferred, approximately 4,000 to 10,000 poise. At 290° C., these viscosities are 3000-30,000 and 5000-25,000, respectively. This ensures good processability in injection molding machines.

The polyamides of the present invention are especially suitable for use in injection molding methods, for the manufacture of various molded parts. Depending on the melt viscosity of the granulate used, injection temperatures of 270° to 310° C. or, if necessary, even higher can be employed whereat the risk of discoloration is slight. The material displays good flow and forming characteristics. In order to achieve better mold filling, the tools can be tempered without affecting the mold release properties. In general, it is unnecessary to coat the granulates with lubricants such as calcium or magnesium stearate.

The transparent polyamide of the present invention may be mixed or alloyed with another homopolyamide, copolyamide or polyamide mixture. This may be achieved by co-extrusion of the granulates. For example, nylon 12, nylon 6 or nylon 66 can be used as additional homopolyamides. Suitable additional copolyamides are those out of which the above mentioned homopolyamides are made. Preferably not more than 50% by weight of such additional polyamides are used, based on the total weight of the mixture. By allowing a further component to the polyamide of the present invention, the mechanical properties of the original polyamide can be varied. For example, impact strength and notch impact strength can be improved in this way. If a polyamide which is used as an additional component is primarily introduced as component (c) (for example, nylon 12), the transparency stability of the alloy in boiling water is only slightly affected.

The following Examples illustrate the present invention. In the Examples, IPS represents isophthalic acid, IPS-95 represents a mixture of isophthalic acid and 5 mol. % of terephthalic acid, and TPS represents terephthalic acid. In the Tables, proportions by weight of additives are based on the sum of the components, and the various symbols are as follows:

Cond. con.: condensation conditions
Co. time: total condensation-time in hours;
Co. temp.: maximum condensation temperature in the final phase of the polycondensation;
$\eta$ rel.: relative solvent viscosity measured in a 0.5% solution of the polymer in m-cresol;
dTA,Tg: glass conversion temperature measured on a dry specimen of the polymer with a differential calorimeter of the 1B type supplied by Perkin-Elmer, with a heating rate of 32° C./min. and a sensitivity in accordance with R 16;
Melt: melt viscosity (a measure of the flow behavior of the polyamide melt), determined at a melt temperature of 290° C. under a load of 12.5 kp with a melt index instrument supplied by Goettfert, type MFI 21.6 using an 8 mm long nozzle of diameter 2.1 mm.

The transparency stability in boiling water is defined as follows:
very good: a sheet displays a transparency stability in boiling water of several weeks;
good: a sheet displays a transparency stability in boiling water of approximately 3 days;
average: a sheet displays a transparency stability in boiling water of approximately 1 day; and
bad: a sheet becomes cloudy in boiling water within a few hours.

In Table 1, in the first column, the types and proportions by weight of component (c) are shown. The second main column contains the equivalent ratio of the starting materials used; wherein, for the purpose of direct comparison with component (c), the standard formula refers to one pair of amide-forming groups, when part amino acids and part salts are used.

Table 2 contains, in the first column, the variations in relation to the main acid component (b).

Mol. or proportion by weight means that where a proportion of component (b) is replaced by another dicarboxylic acid, this proportion (mol. or by weight) refers solely to component (b).

In tests according to Tables 3 and 4 where the amine component (a) is varied, the following applies:
Dimecycane: 4,4'-Diamino-3,3'dimethyl-dicyclohexylmethane
Dicypropane: 2,2-bis(4-aminocyclohexyl)propane
Dicycane: 4,4'-diaminodicyclohexylmethane Column 1 of Table 3 shows the molar ratio of the individual diamines compared to the total diamine component (a).

The "Additive" column of Table 4 shows the proportions by weight of the third component (c) which in these examples is out of the scope of the invention), in percentages by weight, based on the sum of the starting materials.

EXAMPLES 1 to 6

In the following Examples, component (c) was varied. 4,4'-diamino-3,3'-dimethyldicyclohexylmethane in the form of the commercially available liquid isomer mixture (BASF, W. Germany) was used throughout as component (a), and IPS-95 (Amoco, U.S.A.) as component (b), and in each case the molar ratio of these two components was 1:1. The proportion by weight of component (c) is between 36 and 39%, based on the sum of the starting materials. The molar proportion of component (c) varies between 1.1 and 1.55 per mol of component (b). The amount of component (c) was established as follows: with the addition of component (c), 12 carbon atoms must be introduced into the polyamide chain per amide bond in components (a) and (b). Accordingly, the molar proportion ($a_M$) of component (c) to be determined, multiplied by the average number of carbon atoms ($N_c$) of component (c) per amide group in component (c), (including the carbon atom of the amide group), yields the constant value of 13. Expressed algebraically:

$$a_M \cdot N_c = 13$$

Evaluation of this relationship for each Example given shows that the preferred amount of component (c) is from 35 to 40% by weight, based on the sum of the weights of the starting substances. It is therefore preferred to use component (c) ingredients with a high average number of carbon atoms such as, for example, aminolauric acid and the salt of diaminododecane with sebacic or dodecanedioic acid.

COMPARISON EXAMPLES 7 and 8

The proportion of component (c) in these Examples is such that completely transparent polyamides are still obtained but, in the case of Example 7, the transparency of stability in boiling water is not as good as the products of Examples 1 to 6. The material remains transparent for only a few hours.

The product of Example 8 is somewhat brittle, as compared with the other products.

WORKING SPECIFICATIONS FOR EXAMPLES 1 TO 8

The components were weighed in a glass condensation apparatus, the air was completely replaced by nitrogen, the apparatus was immersed in molten salt, and the temperature of the educt mixture was raised to about 230° C. with stirring. The pre-condensation was thereby initiated, and the bulk of the reaction water was distilled off. The melt was thus made increasingly more viscous. The temperature was then raised so that, after one hour, it was 280° to 300° C. In each case, after a total condensation time of 3.5–6 hours, the test was ended. The agitator was removed from the melt and this was broken out from the glass tube after solidification. The analyses of the completely transparent materials were determined as shown at the end of the Table.

TABLE 1

| Ex. No | Component (c) Type | Weight (%) | Equivalent Ratio Amine | IPS | Component (c) | Cond. con. Tot. Co. Time (h) | Max. Co. Temp. (°C.) | η rel. 0.5% m-Cr | DTA Tg, °C. | η melt (poise) 12,5 kp, 290° C. | Transp. Stab. in Boiling Water |
|---|---|---|---|---|---|---|---|---|---|---|---|
| 1 | Aminolauric acid | 36.5 | 1 | 1 | 1.1 | 3.8 | 280 | 1.46 | 156 | 2700 | very good |
| 2 | Aminoundecoic acid | 37 | 1 | 1 | 1.2 | 3.5 | 280 | 1.46 | 157 | 4400 | good |
| 3 | 12.12 salt | 36.5 | 1 | 1 | 1.1 | 4.0 | 280 | 1.53 | 153 | 6000 | good |
| 4 | 12.10 salt | 37 | 1 | 1 | 1.2 | 5.5 | 280 | 1.59 | 170 | 12000 | good |
| 5 | 8.9 salt | 35.9 | 1 | 1 | 1.553 | 5.5 | 300 | 1.58 | 167 | 26000 | good |
| 6 | 8.10 salt | 38.2 | 1 | 1 | 1.47 | 6.0 | 300 | 1.78 | 161 | 60000 | good |
| 7 | Aminolauric acid | 44.0 | 1 | 1 | 1.485 | 6.0 | 280 | 1.52 | 138 | 2600 | poor |
| 8 | " | 32.0 | 1 | 1 | 0.89 | 6.0 | 280 | 1.459 | 175 | 3000 | good |

EXAMPLE 9 AND COMPARISON EXAMPLES 10 TO 12

In these Examples 4,4'diamino-3,3'-dimethyl-dicyclohexylmethane was again used as component (a). Component (c) was aminolauric acid. The molar ratio of diamine to dicarboxylic acid to component (c) was, in all cases, 1:1:1.1. In Example 9, IPS-85 was used as dicarboxylic acid, i.e. isophthalic acid containing 15% terephthalic acid (Amoco). In Examples 10, 11 and 12, IPS-95 was used but partially replaced by an aliphatic dicarboxylic acid. It can be seen from Table 2 that with a constant ratio of amine:acid:amino acid, the glass conversion temperature is lowered by partial substitution of the aromatic acid component, and the transparency stability in boiling water is also reduced. Nonetheless, in all cases, transparent polyamides are obtained which are suitable for use in, for example, injection molding. Examples 10 to 12 are for comparison purposes as the ratio of "(c)"+dicarboxylic acids to total ingredients exceeds 40%.

The test procedure was that used in Examples 1 to 8.

Example 13, a molar 1:1 mixture of 4,4'-diamino-3,3'-dimethyl-dicyclohexylmethane and 4,4'-diaminodicyclohexylmethane; in Example 14, a 1:1 mixture of 4,4'-diamino-3,3'-dimethyl-dicyclohexylmethane and 2,2-bis(4-aminocyclohexyl)propane; and in Example 15, 4,4'-diaminodicyclohexylmethane.

In all three Examples, transparent products were obtained which are quite suitable for use in, for example, injection molding.

The test procedure was that used in Examples 1 to 8.

COMPARISON EXAMPLES 16 to 22

The molar ratio of amine to IPS-95 (components (a) and (b) ) was, in all these Examples, 1:1. 4,4'-Diamino-3,3'-dimethyl-dicyclohexylmethane was the amine used in each of Examples 16, 17, 21 and 22; in Examples 18 and 19, 2,2-bis(4-aminocyclohexyl)propane, and in Example 20, 4,4'-diaminodicyclohexylmethane, was used. From 25 to 36% by weight of caprolactam or AH salt (which are compounds outside the invention) was used instead of component (c). If the proportion by weight of such additives is from 34 to 36% by weight, products are obtained which are cloudy in boiling water after

TABLE 2

| Ex. No. | Additional Dicarboxylic Acids Type | Proportion Mol. % | Weight % | Equivalent ratio Amine | DCA | (c) c | Cond. con. Tot. co. Time (h) | Max. co. Temp (°C.) | η rel. 0.5% m-cr | DTA Tg, °C. | η melt (poise) {72,5, kp,290° C. | Transp. Stab. in Boiling Water |
|---|---|---|---|---|---|---|---|---|---|---|---|---|
| 9 | — | — | — | 1 | 1 | 1.1 | 6 | 280 | 1.626 | 160 | 17,000 | very good |
| 10 | Sebacic acid | 20 | 23.3 | 1 | 1 | 1.1 | 6 | 280 | 1.518 | 147 | 7,000 | average |
| 11 | Dodecanedioic acid | 15 | 19.6 | 1 | 1 | 1.1 | 5 | 280 | 1.402 | 142 | 2,500 | poor |
| 12 | Adipic acid | 30 | 27.4 | 1 | 1 | 1.1 | 5.5 | 280 | 1.605 | 141 | 8,500 | poor |

EXAMPLES 13 to 15

In these Examples, the molar ratio of amine:acid:amino acid was again 1:1:1.1. IPS-95 and aminolauric acid (ALA) were used as components (b) and (c). As component (a), amines and mixtures of various amines within the scope of the present invention were used: in only a few hours. If the molar proportion of these additives is, as preferred for laurolactam, from 1.2 to 1.0 mols per mol of component (b), corresponding to a proportion by weight of the additive of only about 25%, products are obtained with distinctly poorer mechanical properties. The test procedure was that used in Examples 1 to 8.

TABLE 3

| Ex. No | Amine Type | Mol. proportion % | Equivalent Ratio Tot. Amine | IPS | ALA | Cond. Con. Tot. Co. Time (h) | Max. co. Temp. (°C.) | η rel. 0.5% m-cr | DTA Ig, °C. | ηmelt (poise) 12,5 kp, 290° C. | Transp. Stability in boiling Water |
|---|---|---|---|---|---|---|---|---|---|---|---|
| 13 | Dimecycane Dicycane | 50 50 | 1 | 1 | 1.1 | 3.5 | 280 | 1.622 | 147 | 10,000 | good |
| 14 | Dimecycane Dicypropane | 50 50 | 1 | 1 | 1.1 | 5.0 | 300 | 1.677 | 151 | 24,000 | good |

TABLE 3-continued

| | Amine | | Equivalent Ratio | | | Cond. Con. | | Analyses | | | Transp. Stability |
|---|---|---|---|---|---|---|---|---|---|---|---|
| Ex. No | Type | Mol. proportion % | Tot. Amine | IPS | ALA | Tot. Co. Time (h) | Max. co. Temp. (°C.) | η rel. 0.5% m-cr | DTA Tg, °C. | ηmelt (poise) 12,5 kp, 290° C. | in boiling Water |
| 15 | Dicycane | 100 | 1 | 1 | 1.1 | 6.3 | 280 | 1.633 | 143 | 7,000 | moderate |

TABLE 4

| | | | | Equivalent Ratio | | | Cond. Con. | | Analyses | | | Transp. Stability |
|---|---|---|---|---|---|---|---|---|---|---|---|---|
| Ex. No. | Amine Type | Component (c) Type | Weight % | Amine | IPA | IPA Additive | Tot. co. Time (h) | Max. co. Temp. (°C.) | η rel. 0.5% m-cr | DTA Tg, °C. | η melt (poise) 12,5 kp, °C. | in boiling water |
| 16 | Dimecycane | Capro- | 24.8 | 1 | 1 | 1.2 | 4.5 | 280 | 1.407 | 172 | 6000 | poor |
| 17 | Dimecycane | | 34 | 1 | 1 | 1.875 | 5.5 | 280 | 1.453 | 147 | 3500 | poor |
| 18 | Dicypropane | lactam | 24.8 | 1 | 1 | 1.2 | 5.0 | 280 | 1.526 | 189 | 30000 | good |
| 19 | Dicypropane | | 34 | 1 | 1 | 1.875 | 5.5 | 280 | 1.505 | 150 | 11000 | poor |
| 20 | Dicycane | | 32.4 | 1 | 1 | 1.62 | 5.5 | 280 | 1.507 | 147 | 17000 | poor |
| 21 | Dimecycane | AH- | 24.8 | 1 | 1 | 1.0 | 6.0 | 280 | 1.520 | 192 | 21000 | good |
| 22 | Dimecycane | Salt | 34.0 | 1 | 1 | 1.61 | 5.0 | 280 | 1.652 | 169 | 16000 | poor |

EXAMPLE 23

11.50 kg of the liquid isomer mixture of 4,4'-diamino-3,3'-dimethyl-dicyclohexylmethane and 10.5 kg of lauric lactam were stirred with 3 kg water and slowly heated to 180° C. in a polycondensation autoclave. Over 15 minutes, 8.0 kg IPS-95 (Amoco, U.S.A.) was then dispersed in the melt (with stirring) to produce a homogeneous suspension, to which 29 g of benzoic acid and 3 g of an anti-foaming agent of the silicone type were added. The autoclave was then made gas-tight so that the melt was under a cushion of steam. With further stirring, the temperature of the melt was raised to 280° C. A pressure of 20 atm. was thus built up, which was maintained for one hour. The pressure was then slowly reduced to atmospheric pressure and the condensation carried out under a stream of nitrogen for two hours at 280° C. Finally, the temperature of the melt was raised to approximately 300° C. and stirred for approximately 4 hours, until no further rise in viscosity of the melt could be detected.

The product was taken from the autoclave and granulated. Its relative viscosity was 1.512 and its melt viscosity was 10,500 poise at 280° C., measured under a pressure of 12.5 kg. Its glass conversion point was 151° C.

ASTM test bars and small Deutsche Industrienormen (DIN) bars (50×5×4 mm) were injection molded on an injection molding machine at 280° C. cylinder temperature, and the mechanical characteristics determined. The tensile strength at yield and the tensile strength at break, according to DIN 53455, were respectively 950 and 650 kg per cm². The flexural strength at deflection, according to DIN 53452, was 1200 kp/cm². When determining the impact strength, according to DIN 53453, the material did not break. The notched impact strength of the material, according to DIN 53453, was 5 cm kg/cm². The material displayed a ball indentation hardness, according to Verein Deutscher Elektrotechniker (VDE) 0302, after 60 seconds, of 1100 kg/cm². *In commercially available transparent polyamides, the moisture absorption under these conditions is generally about twice as high in each case.

*The moisture take up of 3 mm thick DIN test-bars after 150 days in an atmosphere of 50% relative humidity at 23° C. was 1,1 weight-% and in water of 23° C. was 3,1 weight-%.

As a result of the comparatively low moisture absorption, the mechanical properties of the products of the invention vary only slightly, even in water. Further, the dimensional stability of injection moldings made from the polyamides of the invention is very good.

What is claimed is:

1. A copolyamide having a glass transition temperature (Tg) of 140°–170° C. consisting essentially of the polymeric condensation product of (a) a diamine of the formula

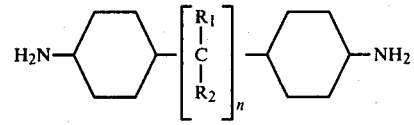

wherein $R_1$ and $R_2$ are independently selected from the group consisting of hydrogen and methyl, n is an integer from 0 to 6, and wherein each cyclohexane ring may be partially or wholly substituted with methyl groups;

(b) a substantially stoichiometric amount, based on the amount of component (a), of a dicarboxylic acid or acid mixture, consisting of from 50 to 100% of isophthalic acid, from 0 to 50 mol or weight % of terephthalic acid, and from 0 to 15 mol % of other polyamide-forming dicarboxylic acid or acids; and (c) 30 to 40% by weight, based on the total weight of components (a), (b) and (c), of a further polyamide-forming component which is selected from the group consisting of amino lauric acid, laurolactam and aminoundecanoic acid, some of said group may be replaced by a member of the class consisting of aliphatic dicarboxylic acids and aliphatic diamines, stoichiometric mixtures of aliphatic dicarboxylic acids and aliphatic diamines, and blends of said salts and mixtures, said member subject to the conditions that the average number of carbon atoms per amide group or between each pair of amide-forming groups is at least 9, that the minimum number of carbon atoms between the amide-forming groups is at least 6, and that, when component (b) is not 100% isophthalic acid or isophthalic acid/terephthalic acid mixture, the sum of the weights of the other polyamide-forming dicarboxylic acids in (b) and of component (c) must be from 30 to 40% by weight, based on the total weight of components (a), (b) and (c), said product having a melt viscosity of 2000 to 15000 poises at about 300° C.

2. A copolyamide according to claim 1 wherein n=1-6.

3. A copolyamide according to claim 1 wherein (c) is taken from the class consisting of aminolauric acid, laurolactam, and aminoundecanoic acid.

4. A copolyamide according to claim 1 wherein (b) is an isophthalic acid-terephthalic acid mixture.

5. A copolyamide according to claim 1 wherein said melt viscosity is 4000 to 10,000 poises and Tg is 150° to 170° C.

6. A copolyamide according to claim 1 wherein (a) consists essentially of bis (4-amino-3-methylcyclohexyl) methane.

7. A copolyamide according to claim 1 wherein (a) is a liquid isomeric mixture.

8. A copolyamide according to claim 1 wherein (b) consists essentially of isophthalic acid.

9. A copolyamide according to claim 1 wherein (c) consists essentially of aminolauric acid.

10. A copolyamide according to claim 1 wherein (c) consists essentially of laurolactam.

11. A copolyamide according to claim 1 wherein (a) consists essentially of 2,2-bis (4-aminocyclohexyl) propane.

12. A copolyamide according to claim 1 wherein (a) is selected from the group consisting of 4,4'-diaminodicyclohexyl methane and 1,2 bis (4-amino-dicyclohexyl) ethane.

13. A copolyamide according to claim 1 wherein (b) is an isophthalic acid-terephthalic acid mixture and contains another polyamide-forming dicarboxylic acid.

14. A copolyamide according to claim 13 wherein said polyamide-forming dicarboxylic acid has at least 8 carbon atoms.

15. A copolyamide according to claim 14 wherein said polyamide-forming dicarboxylic acid is taken from the group consisting of suberic acid, azelaic acid, sebacic acid, dodecanedioic acid, or a branched chain-substituted homolog thereof.

16. A copolyamide according to claim 1 wherein (c) is aminoundecanoic acid.

17. A copolyamide according to claim 1 wherein said diamines of (c) are selected from the group consisting of 1,6 diaminohexane, 1,8 diaminooctane, 1,9 diaminononane, 1,10 diaminodecane, 1,12 diaminododecane, trimethylhexamethylene diamine and mixtures thereof.

18. A copolyamide according to claim 1 wherein said dicarboxylic acids of component (c) are selected from the group consisting of azelaic acid, sebacic acid, dodecanedioic acid and mixtures thereof.

19. A copolyamide according to claim 1 wherein said dicarboxylic acids and aliphatic amines of (c) are selected from the group consisting of 1,6 diaminohexane; 1,12 diaminododecane; trimethylhexamethylenediamine; 1,8 diaminooctane; 1,9 diaminononane; 1,10 diaminodecane; azelaic acid; sebacic acid; dodecanedioic acid and salts thereof.

* * * * *